United States Patent [19]

Suzuki

[11] 4,292,131
[45] Sep. 29, 1981

[54] COUPLING MECHANISM OF CONTROL ROD FOR NUCLEAR REACTOR

[75] Inventor: Tomohiro Suzuki, Hitachi, Japan

[73] Assignee: Hitachi, Ltd., Tokyo, Japan

[21] Appl. No.: 917,180

[22] Filed: Jun. 20, 1978

[30] Foreign Application Priority Data

Jun. 20, 1977 [JP] Japan .................................. 52/73692

[51] Int. Cl.³ .............................................. G21C 7/14
[52] U.S. Cl. ................................................ 176/36 C
[58] Field of Search ........................ 176/36 C, 36 R;
294/86.24, 86.25, 86.32, 90, 93, 94, 99 R, 99 S;
166/98; 24/201 R, 201 A, 211 R; 403/248,
290, 316, 342

[56] References Cited

U.S. PATENT DOCUMENTS

| 2,894,779 | 7/1959 | Kushner et al. | 176/36 C |
| 3,079,323 | 2/1963 | Hawke | 176/36 C |
| 3,356,145 | 12/1967 | Fredd | 294/86.32 |
| 3,474,398 | 10/1969 | Piorruneck | 24/211 R |
| 3,595,126 | 7/1971 | Norton | 403/290 |
| 3,604,746 | 9/1971 | Notari | 176/36 C |
| 3,698,756 | 10/1972 | Groves | 294/86.25 |
| 3,905,634 | 9/1975 | Johnson et al. | 176/36 R |
| 4,012,155 | 3/1977 | Morris | 403/290 |
| 4,053,355 | 10/1977 | Vuckovick | 176/36 C |

FOREIGN PATENT DOCUMENTS

| 1211344 | 2/1966 | Fed. Rep. of Germany | 176/36 C |
| 1286653 | 1/1969 | Fed. Rep. of Germany | 176/36 C |
| 1957610 | 5/1971 | Fed. Rep. of Germany | 176/36 R |
| 2409181 | 9/1975 | Fed. Rep. of Germany | 176/36 R |
| 53-21076 | 6/1978 | Japan | 176/36 R |

Primary Examiner—S. A. Cangialosi
Attorney, Agent, or Firm—Craig and Antonelli

[57] ABSTRACT

Each of control rods inserted in the core of a nuclear reactor is coupled to a control rod driving apparatus for moving the control rod in an axial direction by a coupling mechanism including a gripper formed at a lower end of a driving extension shaft adapted to be driven by the control rod driving apparatus, and a finger mounted at an upper end of the control rod for engagement with the gripper. A cam is located in the interior of the driving extension shaft for bringing the gripper and the finger into and out of engagement with each other for coupling and uncoupling the control rod and the control rod driving apparatus.

5 Claims, 5 Drawing Figures

COUPLING MECHANISM OF CONTROL ROD FOR NUCLEAR REACTOR

BACKGROUND OF THE INVENTION

This invention relates to a coupling mechanism for coupling each of control rods inserted in the core of a nuclear reactor to a control rod driving apparatus.

The power of a nuclear reactor is controlled by the control rods inserted in and withdrawn from the reactor core. Insertion and withdrawing of the control rods in and from the reactor core are effected by the control rod driving apparatus which moves each control rod axially thereof. The control rod driving apparatus performs the function of controlling the rate of movement of each control rod, and is provided with means for inserting each control rod as quickly as possible in the reactor core when it is necessary to effect emergency shutdown of the reactor as the result of the occurrence of an accident in an installation or equipment associated with the reactor. More specifically, the control rod driving apparatus is provided with normal control rod inserting and withdrawing means for moving each control rod at a predetermined rate and emergency control rod inserting means for inserting each control rod at high speed to effect emergency shutdown of the reactor.

As is well known, prolonged use of a control rod results in a decline in the function thereof to control the power of a nuclear reactor. Thus old control rods are replaced by new ones usually at regular intervals. To this end, each control rod is coupled to the control rod driving apparatus by a coupling mechanism which allows the control rod to be detachably coupled to the control rod driving apparatus.

A primary requirement for the construction of a control rod coupling mechanism is that coupling and uncoupling of the control rod and the control rod driving apparatus can be effected readily without any trouble. This requirement should be met because, when the aforesaid control rod inserting means for inserting the control rod in the core in an emergency fails to operate successfully, it is necessary to uncouple the control rod from the control rod driving apparatus to permit the former to drop by gravity into the reactor core. Thus the control rod is arranged vertically. Moreover, the control rod is contaminated with radioactivity once it is inserted into the reactor core, so that manual operation of the coupling mechanism should be avoided.

One type of control rod coupling mechanism known in the art which meets the aforesaid requirement includes a hollow driving extension shaft extending from the control rod driving apparatus for axial reciprocatory movement and having a lower end portion divided peripherally into a plurality of pieces by forming therein a plurality of axially directed slits of a suitable length to provide a plurality of fingers each formed with an outwardly bulging portion changing smoothly in contour. The extension shaft has mounted in its hollow portion a cam which is adapted to move through the hollow portion for reciprocatory movement axially of the shaft to force the bulging portions of the fingers outwardly by a protruding portion of the cam. The fingers are restored to their original portions by the elastic force of restitution inherent in the fingers themselves when the cam is released from engagement with the fingers. To this end, the fingers are formed of a material of a small thickness so that they may have a suitable elastic restoring force. Meanwhile the control rod is formed at its upper end portion with an axial hole of a suitable length to allow the lower end portion of the extension shaft to be inserted therein, the hole being formed in its inner wall surface with grooves each adapted to receive therein one of the bulging portions of the fingers in engagement therewith. The driving extension shaft is arranged in axial alignment with the control rod, and is moved downwardly from this position to permit the forward end of the fingers to be received in the hole formed in the upper end of the control rod in a manner to allow the bulging portions of the fingers to be brought almost into engagement in the grooves. While the bulging portions of the fingers are in this position, the cam is actuated to force the bulging portions of the fingers outwardly by the protruding portion of the cam into intimate engagement in the grooves, thereby completing the coupling of the control rod to the control rod driving apparatus.

In the event that it is necessary to effect emergency shutdown of the reactor and the aforementioned means for quickly inserting the control rod in the reactor core in an emergency fails to function, the cam is actuated to release the force acting to force the bulging portions of the fingers outwardly so as to bring the bulging portions out of engagement in the grooves and permit the control rod to move downwardly by its own weight into the reactor core. U.S. Pat. No. 3,604,746 discloses a mechanism similar in construction to the aforementioned mechanism. The aforementioned type of coupling mechanism meets the requirement that the control rod should be readily coupled and uncoupled without trouble as stated previously.

The coupling mechanism for coupling the control rod to the control rod driving apparatus is inserted in the reactor core in which it is subjected to the irradiation of neutron rays. As a result, the materials of the mechanism are liable to deteriorate, and particularly the fingers which are formed to have a small thickness are markedly affected by the irradiation of neutron rays. Moreover, when the control rod is coupled to the driving apparatus, an axially directed force is exerted on the fingers as aforementioned, so that the fingers tend to undergo buckling. If this phenomenon occurs, not only the control rod but also the control rod driving mechanism itself or some of the component parts of the mechanism should be replaced, thereby interfering with the efficient operation of the nuclear reactor.

Thus when the coupling mechanism shows deterioration, there arises the necessity for replacing the old mechanism by a new one or using a new type of coupling mechanism which is free from the development of a buckling phenomenon due to deterioration of the material.

SUMMARY OF THE INVENTION

An object of this invention is to provide a control rod coupling mechanism including finger means which can readily be replaced or which is expendable while other components can remain in service, when the finger means is deteriorated.

Another object is to provide a control rod coupling mechanism which is constructed such that the occurrence of a buckling phenomenon in the finger means can be avoided.

The outstanding characteristics of the invention are that the finger means is located in the control rod, not in

DESCRIPTION OF THE PREFERRED EMBODIMENTS

Figure 1:
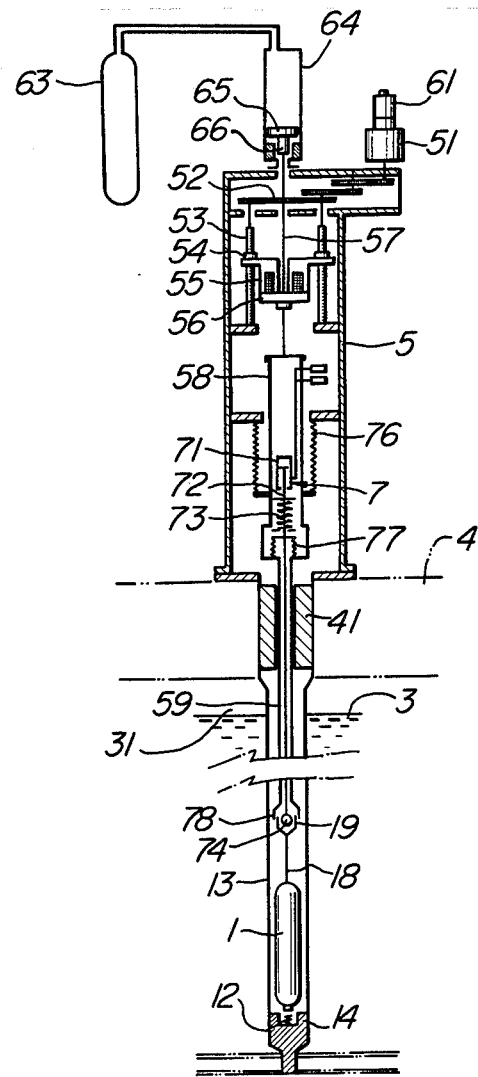
FIG. 1 is a vertical sectional view of a control rod and a control rod driving apparatus showing the construction thereof.

FIG. 1 shows a control rod used with a nuclear reactor of the liquid cooled type and a control rod driving apparatus. As shown, the control rod 1 is formed at its upper end with a control rod extension shaft 18 and supported at its lower end, through a shock-absorbing spring 12, in a dash pot 14 located on the bottom of a lower guide tube 13. The control rod driving apparatus is housed in a casing 5 securely fixed to a rotary plug 4 spaced apart from the liquid level of liquid sodium 3 by a space 31, and is provided with means for moving the control rod 1 at a predetermined rate for controlling the reactor power during a normal operation of the reactor and means for moving the control rod to effect emergency shutdown of the reactor.

In moving the control rod 1 during a normal operation of the reactor, rotation of a motor 51 is transmitted, by way of a speed reducing gearing 52, to ball screws 53 whose rotational movements are converted, by ball nuts 54, into a vertical linear movement of a hold magnet 55. An armature 56, which is normally attracted to the hold magnet 55, is securely fixed to a piston rod 57. Thus a cylindrical member 58, a driving extension shaft 59, and a gripper 78 formed at a lower end of the shaft 59, which are successively connected to the piston rod 57, move in vertical linear movement together with the hold magnet 55.

Detachably attached to an upper end of the control rod extension shaft 18 is a finger 19 which is adapted to be gripped by the gripper 78. Thus the vertical linear movement of the driving extension shaft 59 caused by rotation of the motor 51 is transmitted to the control rod 1 which moves vertically within the guide tube 13 to control the reactor power.

Figure 2:
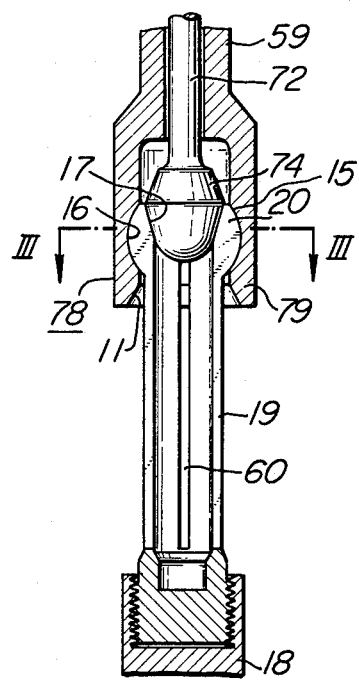
FIG. 2 is a sectional view, on an enlarged scale, of the coupling mechanism according to the present invention for coupling the control rod to the control rod driving apparatus.
Figure 3:
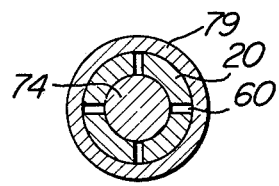
FIG. 3 is a sectional view taken along the line III—III in FIG. 2.

FIGS. 2 and 3 show in detail the construction of the finger 19 which is peripherally divided into four finger elements by four axially extending slits 60. Each of the finger elements of the finger 19 is formed at its upper end portion with an outwardly extending bulge 20 of a contour which curves smoothly. The gripper 78, which is formed in the lower end portion of the driving extension shaft 59, includes a socket 79 which is large enough to receive therein the upper end portion of the finger 19, and is formed, in its inner wall surface, with vertical grooves 16 each adapted to come into engagement with one of the bulges 20 at the upper end of the finger 19. The finger 19 has a small thickness as shown so that it has a suitable degree of resilience. To facilitate the engagement of the finger 19 with the gripper 78, inclined surfaces 11 and 15 are formed on the gripper 78 and the finger 19 respectively. The finger 19 is formed, on inner wall surfaces of the bulges 20 at the upper end thereof, with inclined surfaces 17 for facilitating the insertion of a cam 74 in the upper end portion of the finger 19.

The position of the control rod 1 is detected by a synchronous transmitter 61 operatively associated with the ball screws 53 as shown in FIG. 1. The specific points, such as upper and lower limits, which are reached by the control rod 1 are detected by limit switches, not shown.

When the control rod 1 is replaced by a new one, it is necessary to uncouple the control rod 1 from the control rod driving apparatus by releasing the same from engagement with the gripper 78. To this end, there is provided latch means 7 comprising a latch actuating cylinder 71, a cam shaft 72 having a piston connected to its upper end, a latch actuating spring 73 urging the cam shaft 72 to move upwardly by its biasing force, and the cam 74 formed at a lower end of the cam shaft 72.

The latch actuating cylinder 71 is located in the cylindrical member 58, and the cam shaft 72 extends through the interior of the driving extension shaft 59. The bulges 20 formed at the upper end of the finger 19 secured to the upper end of the control rod extension shaft 18 are forced tightly against the grooves 16 formed in the wall of the socket 79 of the gripper 78 at the lower end portion of the driving extension shaft 59 by the cam 74 at the lower end of the cam shaft 72 when the latter moves downwardly, whereby the control rod 1 is normally coupled to the control rod driving apparatus.

When it is desired to uncouple the control rod 1, the control rod driving mechanism is actuated to slightly withdraw the control rod 1 from its fully inserted position to apply the weight of the control rod 1 to the coupling, so that air pressure will act on the underside of the piston connected to the upper end of the cam shaft 72 in the latch actuating cylinder 71. This will move the cam shaft 72 and cam 74 upwardly and enable the bulges 20 at the upper end of the finger 19 to move radially. Thus the bulges 20 at the upper end of the finger 19 will move radially inwardly and be released from engagement with the grooves 16 in the wall of the socket 79, with the result that the finger 19 will move downwardly together with the control rod 1. This completes the uncoupling of the control rod 1. To couple the control rod 1 to the control rod driving apparatus, the driving apparatus is actuated while the cam 74 is in its upper position and the gripper 78 is moved downwardly. (Coupling can be effected by performing the uncoupling steps in reversed order.)

The space 31 above the liquid level of liquid sodium 3 is generally filled with inert helium gas or argon gas as a cover gas. The rotary plug 4 is provided with a shield sleeve 41 for preventing the invasion of the driving mechanism above the rotary plug 4 by the sodium vapor containing cover gas and for avoiding a streaming effect. A bellows 76 for reciprocating movement is provided between the cylindrical member 58 and the casing 5 to maintain the cylindrical member 58 airtight when it moves vertically. A latch actuating bellows 77 is provided between the cam shaft 72 and the cylindrical member 58 for preventing the invasion of the cylindrical member 58 by the vapor flowing upwardly through a gap between the cam shaft 72 and the finger 19.

Driving of the control rod 1 for effecting emergency shutdown is carried out by de-energizing the hold magnet 55. An accumulator 63 contains high pressure gas sealed therein to normally apply pressure to the upper surface of a piston 65 in a cylinder 64. Upon de-energization of the hold magnet 55, the armature 56 is released from engagement with the magnet 55. When this is the case, the pressure applied to the upper surface of the piston 65, combined with gravity, causes the piston 65, piston rod 57, cylindrical member 58, driving extension shaft 59, gripper 78 and control rod 1 to suddenly move downwardly as a unit from a point in the path of vertical movement of these parts. The energy of downward movement of these parts is absorbed by a dash ram 66 mounted beneath the piston 65 and the shock absorbing spring 12 and dash pot 14 located on the bottom of the lower guide tube 13, immediately before the end of the downward stroke of these parts is reached. FIG. 1 shows the control rod 1 in its fully inserted position.

In order to ensure that nuclear production of power is safe, this type of control rod controlling apparatus is provided with two systems of control rod driving means for effecting emergency shutdown, as precautionary measures. One system has been described above. The other system utilizes the latch means 7 as control rod driving means for effecting emergency shutdown, because of the fact that there is the danger that deformation of the elongated driving extension shaft 59 and lower guide tube 13 or failure of other parts of the apparatus shown in FIG. 1 makes it impossible to insert the control rod 1 in the reactor core in emergency. When emergency shutdown of the reactor is effected by this means, air pressure is applied to the latch actuating cylinder 71 to uncouple the control rod 1 from the driving extension shaft 59, and allows the rod 1 to move downwardly by its own weight. When the rod 1 is coupled to the driving extension shaft 59, the combined length of the two parts is very large. However, the length of the control rod 1 alone is equal to several fractions of the combined length, so that the control rod 1 is positively inserted in the reactor core when this means is used.

The embodiment of the coupling mechanism shown in FIGS. 1 to 3 includes the finger 19 which can be uncoupled, together with the control rod 1, from the control rod driving apparatus. Thus inspection and replacement of the finger 19 can be effected when the used control rod is replaced by a new one every six months, for example. This eliminates the need to replace the control rod driving apparatus itself when the finger fails and becomes unfit for service, which is the case with the coupling mechanism of the prior art.

Figure 4:
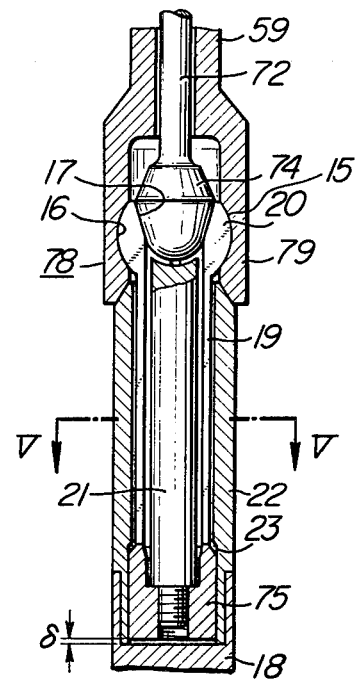
FIG. 4 is a sectional view of another embodiment of the invention.
Figure 5:
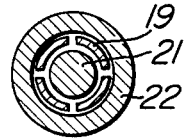
FIG. 5 is a sectional view taken along the line V—V in FIG. 4.

FIGS. 4 and 5 show another embodiment of the coupling mechanism in conformity with the invention which differs from the embodiment described by referring to FIGS. 1 to 3 in that the finger 19 is provided with a protective rod 21 and a protective sleeve 22 located inside and outside the finger 19 respectively.

The protective rod 21 which is located inside the finger 19 is securely fixed at its lower end to a portion 75 formed at the lower end of the finger 19 integrally therewith and loosely fitted, for axial movement, in a socket formed in an upper end portion of the extension shaft 18. A shoulder 23 is formed at the lower end of the outer periphery of the finger 19 which is contiguous with the outer periphery of the integral portion 75. The protective sleeve 22 is securely fixed at its lower end to the upper end of the wall of the socket formed in the upper end portion of the extension shaft 18 and disposed outside the finger 19 in spaced juxtaposed relation to the outer periphery of the finger 19. The protective sleeve 22 is in contact, at its upper end, with the lower end of the wall of the socket 79. The protective sleeve 22 is formed, in its inner wall surface, with an offset portion which is adapted to engage the shoulder 23 at the lower end of the finger 19 for preventing the upward movement of the finger 19.

The finger 19 and the gripper 78 are brought into and out of engagement with each other in the same manner as described by referring to the embodiment shown in FIGS. 1 to 3. In FIG. 4, the finger 19 is shown in engagement with the gripper 78, and the shoulder 23 at the lower end of the outer periphery of the finger 19 is in engagement with the offset portion in the inner wall surface of the protective sleeve 22, while the upper end of the protective sleeve 22 is in contact with the lower end of the wall of the socket 79. A gap $\delta$ is formed between the lower end of the bottom of the socket in the upper end portion of the extension shaft 18. The formation of the gap $\delta$ is caused by the fact that, in bringing the finger 19 into engagement with the gripper 78, when the bulges 20 in the upper end portion of the finger 19 are inserted to a certain degree in the axial grooves 16 in the wall of the socket 79, a component of force urging the finger 19 to move upwardly acts on the finger 19 because of the elastic force of restitution of the finger 19 acting to move the bulges 20 of the finger 19 radially outwardly to their original positions, thereby completing the engagement of the finger 19 with the gripper 78.

In the coupling mechanism constructed as aforesaid, when the lower end of the control rod 1 drops onto the dash pot 14 and shock absorbing spring 12 and the impact of collision into these shock absorbing means is transmitted upwardly through the control rod 1, the impact transmitted to the finger 19 is minimized by the arrangement that the upper end of the protective sleeve 22 is in contact with the lower end of the wall of the socket 79.

The impact of collision of the control rod into the shock absorbing means may act as a force tending to expand the wall of the socket 79 outwardly. Even if the socket 79 is slightly enlarged in size and the cam 74 tends to apply a buckling load to the finger 19, the application of the buckling load to the finger 19 can be prevented to a certain extent by the movement of the finger 19 through the gap $\delta$. Moreover, when the cam 74 moves downwardly, the protective rod 21 can contain the downward movement of the cam 74. Thus it is possible to avoid damage to the finger 19 by the protective rod 21 which might otherwise be caused by the buckling load.

In the embodiment shown in FIGS. 4 and 5, the protective rod 21 and the finger 19 may be securely fixed to the extension shaft 18. This arrangement does no harm to the shock absorbing function of the protective sleeve 22.

Alternatively, the protective rod 21 may be directly attached to the extension shaft 18 and the finger 19 and the protective sleeve 22 and the finger 19 may be arranged such that they are axially movable relative to each other.

What is claimed is:

1. A coupling mechanism for detachably coupling a control rod of a nuclear reactor to a control rod driving apparatus, comprising:

driving extension shaft means connected at one end thereof to said control rod driving apparatus;

gripper means formed at the other end of said driving extension shaft means and including an engaging portion;

control rod extension shaft means arranged coaxially with said driving extension shaft means;

finger means mounted at one end of said control rod extension shaft means and provided with an engaging portion adapted to come into engagement with said engaging portion of said gripper means, said finger means having resilience sufficiently high to enable the engaging portion thereof to be released from engagement with said engaging portion of said gripper means by the weight of the control rod;

cam shaft means adapted to be actuated by latch means for reciprocatory movement independently of said driving extension shaft means; and cam means supported at one end of said cam shaft means and adapted to control the engagement of the engaging portion of said finger means with the engaging portion of said gripper means.

2. A coupling mechanism as claimed in claim 1, further comprising protective sleeve means provided to said control rod extension shaft means and adapted to come into contact with the end of said gripper means when the engaging portion of said finger means is brought into engagement with the engaging portion of said gripper means.

3. A coupling mechanism as claimed in claim 2, wherein said protective sleeve means is loosely fitted to enable said finger means to move axially a suitable distance, and further comprising protective rod means adapted to come into contact with an end of said cam means when said finger means is in engagement with said gripper means.

4. A coupling mechanism as claimed in claim 1, further comprising mounting means for mounting said finger means at one end of said control rod extension shaft means so as to provide a gap between the finger means and the control rod extension shaft means, said finger means being movable within said gap so as to avoid the application of a buckling load to said finger means.

5. A coupling mechanism as claimed in claim 4, further comprising protective rod means arranged within said finger means for bearing a load applied to said finger means when said finger means has moved through the distance of said gap.

* * * * *